United States Patent
Klostermann et al.

(10) Patent No.: US 9,327,694 B2
(45) Date of Patent: May 3, 2016

(54) BRAKE MODULE FOR A HYDRAULICALLY BRAKED TOWING VEHICLE COUPLEABLE TO A PNEUMATICALLY BRAKED TRAILER VEHICLE

(71) Applicant: WABCO GmbH, Hannover (DE)

(72) Inventors: Thilo Klostermann, Hannover (DE); Frank Zielke, Barsinghausen (DE)

(73) Assignee: WABCO GmbH, Hannover (DE)

( * ) Notice: Subject to any disclaimer, the term of this patent is extended or adjusted under 35 U.S.C. 154(b) by 0 days.

(21) Appl. No.: 14/631,204

(22) Filed: Feb. 25, 2015

(65) Prior Publication Data

US 2015/0239441 A1  Aug. 27, 2015

(30) Foreign Application Priority Data

Feb. 27, 2014  (DE) .................. 10 2014 002 614

(51) Int. Cl.
*B60T 8/32* (2006.01)
*B60T 8/17* (2006.01)
*B60T 8/171* (2006.01)
*B60T 15/02* (2006.01)
*B60T 11/10* (2006.01)
*B60T 13/58* (2006.01)

(52) U.S. Cl.
CPC .............. *B60T 8/1708* (2013.01); *B60T 8/171* (2013.01); *B60T 11/108* (2013.01); *B60T 13/581* (2013.01); *B60T 15/027* (2013.01); *B60T 15/028* (2013.01)

(58) Field of Classification Search
CPC ........... B60T 8/32; B60T 8/323; B60T 8/171; B60T 8/1708
See application file for complete search history.

(56) References Cited

U.S. PATENT DOCUMENTS 6,467,854 B2 * 10/2002 Frank ............... B60T 8/323
                                                  137/596.17
8,651,588 B2 *  2/2014 Bensch ............... B60T 8/32
                                                  303/115.2

FOREIGN PATENT DOCUMENTS

| DE | 197 52 147 B4 | 5/1999 |
| DE | 10 2011 053 707 A1 | 3/2013 |
| DE | 10 2011 122 637 A1 | 6/2013 |
| EP | 2 165 901 B1 | 3/2010 |

* cited by examiner

*Primary Examiner* — Christopher Schwartz
(74) *Attorney, Agent, or Firm* — Kramer Levin Naftalis & Frankel LLP

(57) ABSTRACT

In a vehicle combination including a hydraulically braked towing vehicle and a pneumatically braked trailer, a brake module serving as a trailer control valve has an electropneumatic pressure regulating module with an electronic controller that converts pressure signals from a sensor at a hydraulic pressure line from a hydraulically-actuated service brake master cylinder into control pulses for electromagnetic control valves in the regulating module. The control valves are connected via a pneumatic supply pressure inlet to a compressed air reservoir, and via a pneumatic control pressure outlet to a control pressure coupling head. The brake module has a redundancy valve arrangement and is connected via a hydraulic control inlet to the hydraulic pressure line, and via a pneumatic inlet to the reservoir, the hydraulic control pressure determining the magnitude of the pneumatic outlet pressure at an outlet of the redundancy arrangement, which is connected to the coupling head when an electrical/electronic component relevant to brake module operation fails. The pneumatic outlet is disconnected from the coupling head in fault-free operation. The regulating module and redundancy arrangement are connected pneumatically in parallel, and the pneumatic outlet can be connected exclusively to the coupling head.

8 Claims, 5 Drawing Sheets

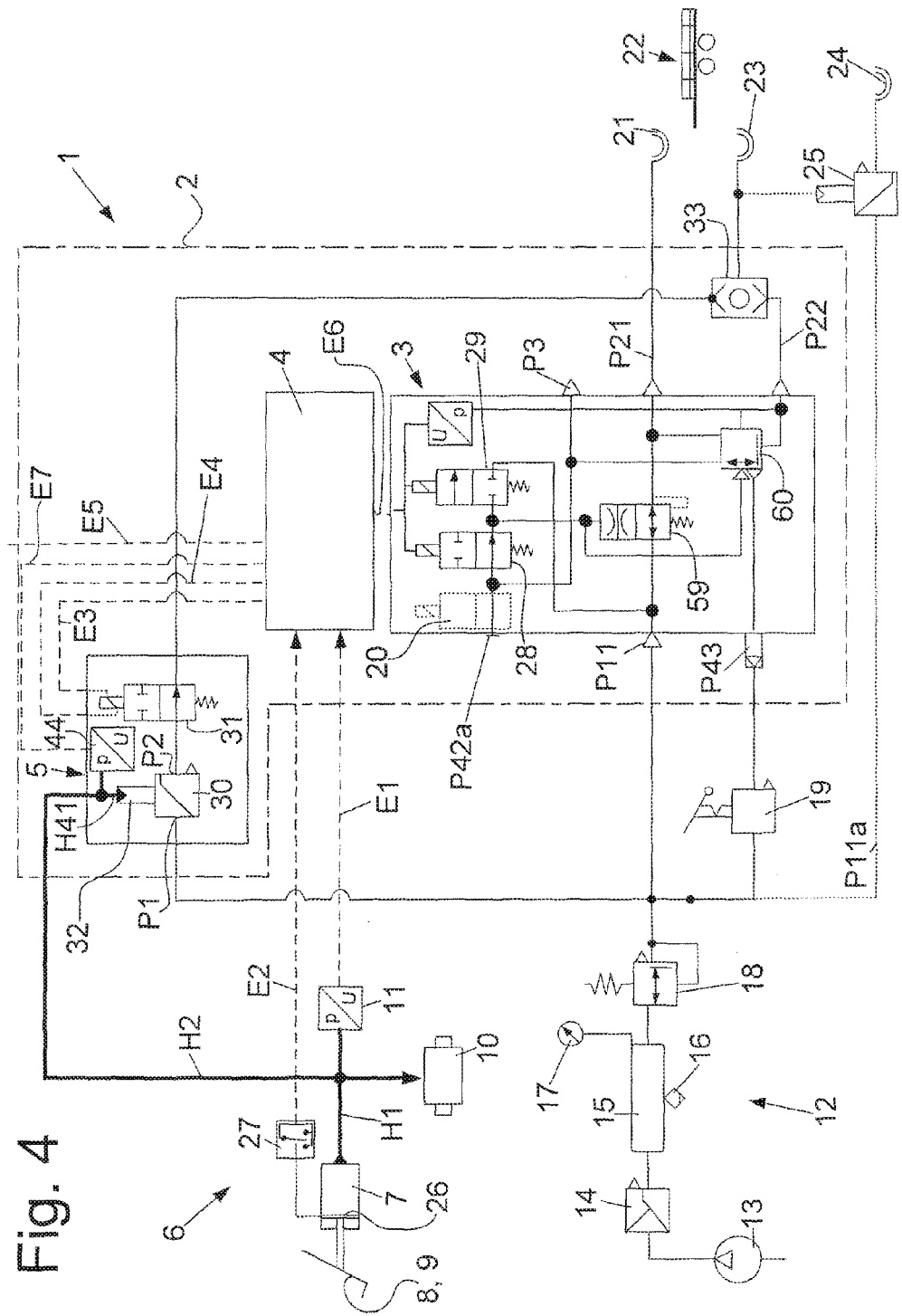

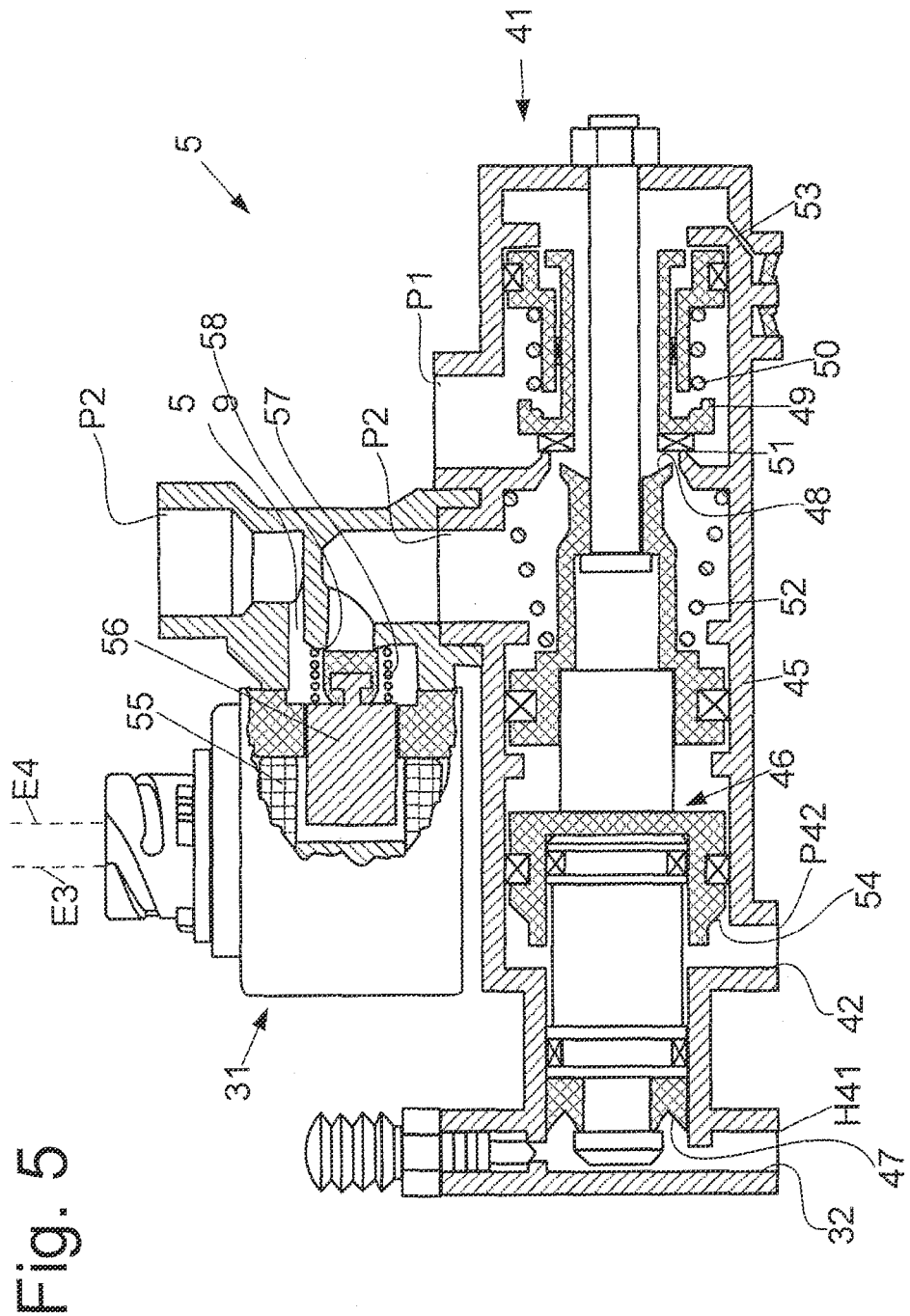

BRAKE MODULE FOR A HYDRAULICALLY BRAKED TOWING VEHICLE COUPLEABLE TO A PNEUMATICALLY BRAKED TRAILER VEHICLE

CROSS-REFERENCE TO RELATED APPLICATION

This application claims the benefit of DE 10 2014 002 614 filed on Feb. 27, 2014, the disclosure of which is incorporated herein by reference in its entirety.

FIELD OF THE INVENTION

The present invention generally relates to a brake module for a hydraulically braked towing vehicle.

BACKGROUND OF THE INVENTION

Certain towing vehicles (e.g., such as used in agriculture or forestry in the form of agricultural traction engines, tractors, and combine harvesters; and, also light trucks) have hydraulic brake systems that, as a rule, consist of brake cylinders that are actuated by foot brake pedals and that feed hydraulic fluid to the corresponding wheel brake cylinders of the towing vehicles' wheels. In contrast, the trailers that can be coupled to these towing vehicles are pneumatically braked. On account of the different pressure media used—namely, hydraulic fluid for the service brake system of the towing vehicle and compressed air for the brake system of the trailer vehicle—it is necessary in vehicle combinations of this type to convert the hydraulic brake pressure of the towing vehicle into a pneumatic pressure for the brake system of the trailer. A trailer control valve that is arranged on the towing vehicle (e.g., WABCO GmbH part number 470 015), has been used for decades to this end. Such trailer control valves are of purely mechanical construction; in them, hydraulic control pressure is converted into pneumatic output pressure and is fed to the trailer vehicle.

A disadvantage of a purely mechanical trailer control valve is that, on account of relatively large hysteresis, feeding brake pressure to the trailer vehicle can involve a certain delay, which might lead to restricted modulation ability and poor response behavior. One advantage of the conventionally constructed trailer control valve is its robust design, which is relatively insusceptible to disruptions. Because such a trailer control valve is operated purely mechanically, no electronic component is present that can fail.

Applicant's DE 197 52 147 B4 describes a brake system for a hydraulically braked motor vehicle, which can be coupled to a pneumatically braked trailer, in which the hydraulic pressure of the service brake is utilized only indirectly to control the trailer's pneumatic brake system. The hydraulic pressure of the outlet lines of the brake master cylinder is converted by a pressure sensor into an electrical signal, which is fed to an electronic control device that evaluates the pressure signal and switches a proportional relay valve, which is connected between a compressed air reservoir and a purely pneumatically controlled trailer control valve. The proportional relay valve is normally closed and is opened only when a corresponding signal is applied to it by the control unit. One advantage that very rapid switching times are made possible, since the problem of hysteresis associated with conventional trailer control valves is dispensed with. However, in the redundancy case that is, in the event of a partial or complete failure of the electronics), solenoid valves, for example, are no longer switched (no longer opened or closed). This can lead to a situation where either braking can no longer be carried out, or an emergency braking operation is effected for instance, by the full supply pressure being guided through a normally open solenoid valve and being fed to a brake system.

EP 2 165 901 131 is concerned with the redundancy case. An electropneumatic loading path and a hydropneumatic loading path are provided. In the normal case, that is, when there are no electrical or electronic faults, a corresponding pressure signal in accordance with the hydraulic pressure is fed to a pneumatic pressure regulating module that generates a pneumatic output pressure for the pneumatic trailer brake system depending on the electrical signal it terms of its function, the pressure regulating module corresponds to an electropneumatic trailer control valve of a truck brake system, in which both the owing vehicle and the trailer vehicle are braked pneumatically. A conventional trailer control valve, in which hydraulic control pressure is converted into a pneumatic output pressure, is connected upstream of the pressure regulating module. The pneumatic output pressure of the trailer control valve is used as control pressure for a control inlet of the pressure regulating module. In the redundancy case, that is, in the case of a failure of the pressure regulating module, the pneumatic output pressure of the trailer control valve is guided through the pressure regulating module and is fed to the trailer brake system. This provides a fallback option in which the trailer brake system can still be actuated. However, disadvantageously, the hydropneumatic trailer control valve is connected upstream of the electropneumatic pressure regulating module. The pressure regulating module therefore receives its pneumatic control pressure from the trailer control valve even in the case of a fully functional electronic regulator. Here, the disadvantages of the hydropneumatic trailer control valve come into effect, since, as a result of the hysteresis of a valve arrangement of this type, the control pressure for the pressure regulating module is supplied with a certain delay, as a result of which the advantages of an electropneumatic pressure regulating module are eliminated at least partially.

SUMMARY OF THE INVENTION

Generally speaking, it is an object of the present invention to improve a brake module of the general type under consideration such that an electronic cotrol signal, which is correlated with the brake pedal position, can be fed to an electropneumatic pressure regulating module directly and without any detour via a hydropneumatic trailer brake valve. A valve arrangement is provided in the system. The system makes the braking operation of the trailer vehicle possible even in the case of failure of the electropneumatic pressure regulating module.

According to an embodiment of the present invention, the redundancy valve arrangement is not connected upstream of the electropneumatic brake module, but, rather, is arranged parallel to the latter in a pneumatic regard and, in the redundancy case, feeds pneumatic brake pressure directly and without any detour via the pressure regulating module to the pneumatic control pressure of the pneumatic brake system of the trailer vehicle. The pneumatic output pressure of the redundancy valve arrangement is therefore utilized exclusively in the redundancy case. That is, the redundancy valve arrangement and electropneumatic brake module have nothing to do with one another and do not influence one another at all in a pneumatic regard, with the result that the electropneumatic brake module operates independently of the redundancy valve arrangement in the normal case. It is only in the redundancy case that the redundancy valve arrangement is started up and then assumes the function of the electropneumatic brake module in a manner that is likewise independent of the electropneumatic brake module.

It is to be understood that the redundancy case refers not only to a failure of one of the electrical or electronic, components of the brake module, but also to the case where the ignition of the towing vehicle is simply switched off. If a towing vehicle with the trailer vehicle coupled to it is at a standstill, for example, on a slope, the vehicle driver can, nevertheless, request a braking operation.

Advantageously, in the normal case, that is, when all of the electrical and electronic components of the towing vehicle and the electropneumatic pressure regulating module are functioning, compressed air is fed directly to the pressure regulating module, which outputs compressed air in accordance with predefined pressure values to the brake system of the trailer vehicle in a controlled manner on account of electronically processed pressure signals of the hydraulic brake system. In the redundancy case, the redundancy valve arrangement is activated and feeds compressed air without a detour via the pressure regulating module to the pneumatic brake system of the trailer vehicle.

According to another embodiment, a shuttle valve is connected on the inlet side to the pneumatic outlet of the redundancy valve arrangement and to the pneumatic control pressure outlet of the electropneumatic pressure regulating module and is connected on the outlet side to the control pressure coupling head. As is known, shuttle valves or double check valves with two inlets cause one inlet, at which no pressure or a pressure that is lower than the pressure that prevails at the other inlet, to be shut off and the inlet with a greater pressure to be open. By way of tile shuttle valve, the system can always feed pressure to the control coupling head—it being unimportant in terms of system technology whether the pressure is generated by the redundancy valve arrangement or by the electropneumatic pressure regulating valve.

According to another embodiment, the redundancy valve arrangement includes a mechanical pressure reducer relay valve and a redundancy solenoid valve, which is open in the non-energized state. The redundancy solenoid valve shuts off the pneumatic outlet of the redundancy valve arrangemetn in the energized state and opens the pneumatic outlet of the redundancy valve arrangement in the non-energized state.

In another embodiment, the pressure reducer relay valve has a hydraulic control inlet and a pneumatic control inlet.

In a further embodiment, the brake actuating member is connected to a 3/2-way valve, which is connected to the compressed air reservoir and is open upon actuation of the brake actuating member and releases compressed air to the connector and into the pneumatic control inlet of the pressure reducer relay valve.

In yet another embodiment, the redundancy solenoid valve is flange-connected directly to the pneumatic pressure outlet of the pressure reducer relay valve.

In a still further embodiment, the pressure regulating module, the electronic controller and the redundancy valve arrangement are arranged in a common housing.

Alternatively, the pressure regulating module, the electronic controller and the redundancy valve arrangement are flange-connected to one another.

Still other objects and advantages of the present invention will in part be obvious and will in part be apparent from the specification.

The present invention accordingly comprises the features of construction, combination of elements, and arrangement of parts, all as exemplified in the constructions herein set forth, and the scope of the invention will be indicated in the claims.

BRIEF DESCRIPTION OF THE DRAWINGS

For a fuller understanding of the inventive embodiments, reference is had to the following description taken in connection with the accompanying drawings in which:

FIG. 4 is a circuit diagram of a brake module according to a third exemplary embodiment of the present invention; and FIG. 5 depicts a redundancy valve arrangement in longitudinal section according to the second exemplary embodiment of the brake module of the present invention,

LIST OF REFERENCE CHARACTERS

Figure 1:
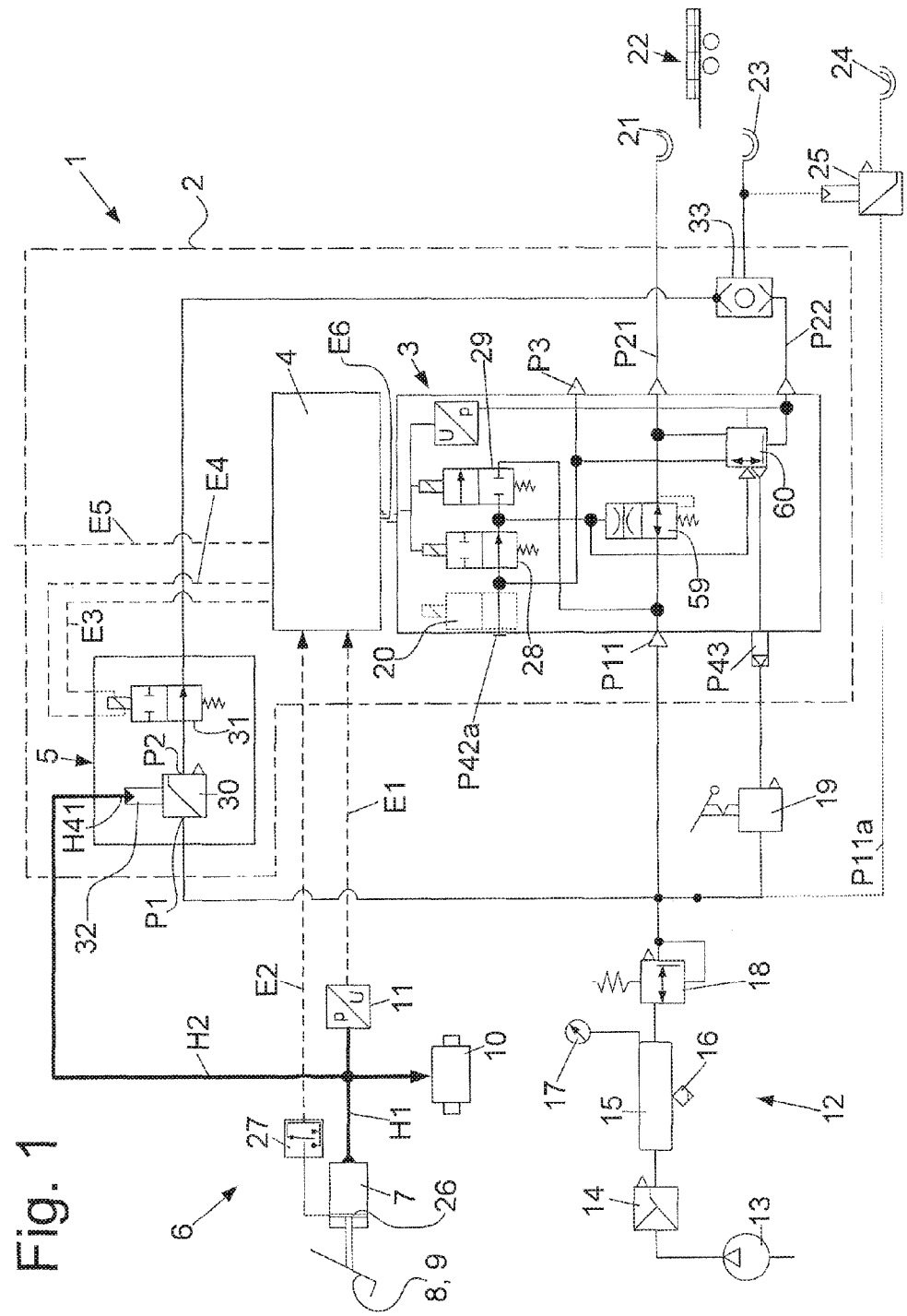
FIG. 1 is a circuit diagram of a brake module according to a first exemplary embodiment of the present invention.

1 Brake module
2 Housing
3 Electropneumatic pressure regulating module
4 Control electronics
5 Redundancy valve arrangement
6 Service brake
7 Brake master cylinder
8 Brake actuating member
9 Brake pedal
9a Brake pedal
10 Wheel brake cylinder
11 Pressure sensor
12 Compressed air generation system
13 Compressor
14 Pressure regulator
15 Compressed air reservoir
16 Drain valve.
17 Manometer
18 Pressure limiting valve
19 Hand brake valve
20 Redundancy valve
21 Supply pressure coupling head
22 Trailer vehicle
23 Control pressure coupling head
24 Single line coupling head
25 Relay valve
26 Piston
27 Electrical switch
28 Solenoid valve
29 Solenoid valve
30 Pressure reducer relay valve
31 Redundancy solenoid valve
32 Hydraulic control inlet
33 Shuttle valve
34 Towing vehicle
35 Agricultural tractor
36 Front wheel
37 Front wheel
38 Rear wheel
39 Rear wheel
40 Rear axle
41 Pressure reducer relay valve
42 Pneumatic control pressure connector
43 3/2-way valve 44 Pressure sensor
45 Housing
46 Relay piston
47 End-side piston face
48 Tappet face
49 Valve sleeve
50 Compression spring
51 Valve seat
52 Second compression spring
53 Ventilating outlet
54 Second piston face
55 Magnet coil
56 Closure member
57 Compression spring
58 Valve seat
59 Outlet duct
E1 Electrical line
E2 Electrical line
E3 Electrical line
E4 Electrical line
E5 Electrical line
E6 Electrical line
E7 Electrical line
H1 Hydraulic pressure line
H2 Hydraulic branching line
H41 Hydraulic control inlet
P1 Pneumatic inlet
P2 Pneumatic outlet
P3 Pneumatic ventilating outlet
P11 Pneumatic supply pressure inlet
P11a Pneumatic supply pressure line
P21 Pneumatic outlet
P22 Pneumatic control pressure outlet
P42 Pneumatic control inlet
P42a Pneumatic control pressure connector
P43 Pneumatic control pressure inlet

DETAILED DESCRIPTION THE PREFERRED EMBODIMENTS

FIG. 1 is a circuit diagram of a first exemplary embodiment of a brake module 1 according to the present invention. The drawing symbols correspond to DIN 74253, whereas the pneumatic and hydraulic connectors and lines are configured in accordance with DIN ISO 6786. The pneumatic lines and connectors are preceded by a "P" and the hydraulic lines and connectors are preceded by an "H" to better distinguish the component designations; the electrical lines have the prefix "E".

A pressure regulating module 1, which is arranged on a towing vehicle (not shown in FIG. 1), acts as a trailer control valve and has an electropneumatic pressure regulating module 3 with art electronic control unit ("ECU") 4 within a housing 2 (indicated diagrammatically). In the exemplary embodiment shown, ECU 4 has dedicated housing that is flange-connected directly to a housing of electropneumatic pressure regulating module 3. It is also possible, however, to attach ECU 4 at another, suitable location of the towing vehicle. The electrical connection of ECU 4 to electropneumatic pressure regulating module 3 is indicated by electrical line E6.

In a manner described in greater detail hereinafter, a redundancy valve arrangement 5 is provided in brake module 1 and is connected functionally to electropneumatic pressure regulating module 3. The components of a hydraulically actuated service brake 6 are arranged outside the brake module 1, of which components a brake master cylinder 7 is shown in simplified form FIG. 1. Brake master cylinder 7 can be actuated by a brake actuating member 8 in the form of a brake pedal 9. Pneumatic fluid passes via a hydraulic pressure line H1 to the individual wheel brake cylinders of the towing vehicle (indicated in FIG. 1 diagrammatically by way of one wheel brake cylinder 10). A hydraulic branching line H2 branches off from hydraulic pressure line H1. Hydraulic fluid is fed to redundancy valve arrangement 5 through hydraulic branching line H2. A pressure sensor 11 is connected to hydraulic pressure line H1. Pressure sensor 11 detects the hydraulic pressure that prevails in hydraulic pressure line H1 and convertsinto an electrical signal that is fed via an electrical line E1 to ECU 4 of brake module 1.

In addition to the service brake 6, by way of which hydraulic pressure can be generated, a compressed air generation system 12 is also present on the towing vehicle. Compressed air generation system 12 includes a compressor 13, which is connected to the drive engine of the towing vehicle, a pressure regulator 14, a compressed air accumulator 15 with a drain valve 16 and a manometer 17, and a pressure limiting valve 18, which is arranged downstream of the compressed air reservoir 15. Via pressure limiting valve 18, a pneumatic supply pressure at the level of approximately 8.5 bar is fed to a pneumatic supply pressure inlet P11 electropneumatic pressure regulating module 3 and a hand brake valve 19, which is connected in parallel and, upon actuation, outputs pneumatic pressure to a pneumatic control pressure inlet P43 to electropneumatic pressure regulating module 3.

Preferably, electropneumatic pressure regulating module 3 with its ECU 4 corresponds as closely as possible to the trailer control valve unit of the type sold by WABCO GmbH under part number 480 204 032 0 (see http:inform.wabco-auto.com/scripts/download.php?from=/intl/de/inform.php&lang=&keywords=48020403 20&file=. . ./intl/drw/9/4802040320.pdf, the content of which is incorporated herein by reference in its entirety).

Pneumatic pressure is introduced into trailer control valve unit 480 204 032 0 via a connector 42. A solenoid valve, which is open in the non-energized state and serves as a redundancy valve in the trailer control valve unit, is arranged directly at the pneumatic connector 42. The redundancy valve 20 is not present in electropneumatic pressure regulating module 3 according to inventive embodiments, for which reason it is only indicated in FIG. 1 and is depicted using dotted lines. Pneumatic control pressure connector P42a, which corresponds to connector 42 of trailer control valve unit 480 204 032 0, is likewise without function in electropneumatic, pressure regulating module 3 according to inventive embodiments, and is closed, for example, by way of a blanking plug. This arrangement has the advantage that one valve can be saved namely, redundancy valve 20.

Otherwise, the electropneumatic pressure regulating module has the valves that are known from trailer control valve unit 480 204 032 0 and its connections, which are not overly important here. For example, embodiments of electropneumatic presure regulating module 3 shown in FIGS. 1, 3 and 4 contain a trailer control valve including a two-way throttle valve 59 and a pressure limiting valve 60. It is important merely that the supply pressure is guided from compressed air reservoir 15 via pneumatic supply pressure inlet P11 through the electropneumatic pressure regulating module and, via a pneumatic outlet P21 of the electropneumatic pressure regulating module, to a supply coupling head 21, to which a corresponding supply line of a trailer vehicle 22 can be coupled. Trailer vehicle 22 can be connected via corresponding coupling heads to supply coupling head 21 and to a control pressure coupling head 23. For the ease where a trailer vehicle of a relatively old design with a single line brake is to be coupled to the towing vehicle, a single line coupling head 24 can also be incorporated into the system. Single line coupling head 24 can be connected by a relay valve 25 to control pressure coupling head 23 and via a pneumatic supply pressure line P11a to compressed air reservoir 15.

In the normal case, that is, when the electric and electronics are functioning, a braking operation of the towing vehicle with trailer vehicle 22, which is coupled thereto, takes place as set forth below.

When the vehicle driver steps on brake pedal 9, a piston 26 of brake master cylinder 7 moves in accordance with the movement of the brake pedal and presses hydraulic fluid via hydraulic pressure line H1 to wheel brake cylinders 10 of the towing vehicle. As a result the wheels of the towing vehicle are braked. The movement of piston 26 of brake master cylinder 7 actuates an electrical switch 27. As a result, an electrical signal is generated and is fed to ECU 4 via an electrical line E2. The movement of piston 26 of brake master cylinder 7 generates a hydraulic pressure, which is detected by pressure sensor 11 and is likewise fed to ECU 4 via electrical line E1. The control electronics calculate from the signals that are obtained how solenoid valves 28, 29 of the electropneumatic pressure regulating module are to be actuated and accordingly energizes the solenoid valves. A corresponding pressure is then output in a controlled manner. The pressure leaves the electropneumatic pressure regulating module via a pressure outlet P22 and is fed to control pressure coupling head 23. The brake control pressure prevailing at control pressure coupling head 23 is fed to the brake system of the trailer and the trailer vehicle is braked correspondingly with the towing vehicle.

Depending on the control strategy and depending on further values that are used to determine the magnitude and the timing of the braking operation of trailer vehicle 22, the trailer vehicle can be braked antecedently, that is, trailer vehicle 22 is braked before the braking operation of the towing vehicle, in order to prevent trailer vehicle 22 from running into the towing vehicle. Further values can he detected by sensors, in order to improve brake regulating strategies. For instance, there can be further sensors to detect, for example, the steering angle of the towing vehicle, wheel rotational speeds, the yaw angle or drag torques of the internal combustion engine or a transmission and feed them to ECU 4. It may thus be suitable, for example, to utilize ABS sensors, which are present in the vehicle, in order to brake trailer vehicle 22 correspondingly in critical driving conditions.

If part of the electronics or the electrical system fails, electropneumatic pressure regulating module 3 is without function. In order that the towing vehicle and trailer vehicle 22 can nevertheless be braked, redundancy valve arrangement 5 is provided. This includes a mechanical pressure reducer relay valve 30 and a normally open 2/2-way solenoid valve, which is connected downstream and forms a redundancy solenoid valve 31. The structural details of redundancy valve arrangement 5 with pressure reducer relay valve 30 and redundancy solenoid valve 31 are described in greater detail hereinafter with reference to FIG. 5. The fundamental function of redundancy valve arrangement 5 is addressed with reference to FIG. 1. In the redundancy case, that is, in the case of a failure of the electronics, hydraulic pressure passes via hydraulic branching line H2 to a hydraulic control inlet 32 of pressure reducer relay valve 30. The hydraulic pressure prevailing at hydraulic control inlet H41 moves a piston of pressure reducer relay valve 30, which causes a pneumatic inlet P1 (connected to compressed air reservoir 15) of the pressure reducer relay valve to be connected to a pneumatic outlet P2. Correspondingly, pressure that is output in a controlled way passes via outlet P2 to redundancy solenoid valve 31. Redundancy solenoid valve 31 is open in the non-energized state, with the result that the pressure that is output in a controlled manner passes via a shuttle valve 33 to control pressure coupling head 23. Shuttle valve 33 is connected first to redundancy solenoid valve 31 and second to pneumatic control pressure outlet P22 of electropneumatic pressure regulating module 3. Depending on the prevailing pressure, shuttle valve 33 connects control pressure coupling head 23 to redundancy solenoid valve 31 or to control pressure outlet P22 of electropneumatic pressure regulating module 3.

When the electronics and the electrical system are functioning, redundancy solenoid valve 31 is closed (since it is then energized and moved into its closed position). As a result, redundancy valve arrangement 5 is rendered inoperative.

Furthermore, FIG. 1 indicates an electrical line E5, via which ECU 4 of electropneumatic pressure regulating module 3 is connected to the CAN bus of the towing vehicle. FIG. 1 also shows a pneumatic ventilating outlet P3 of pressure regulating module 3 that is, however, not of further importance.

Figure 2:
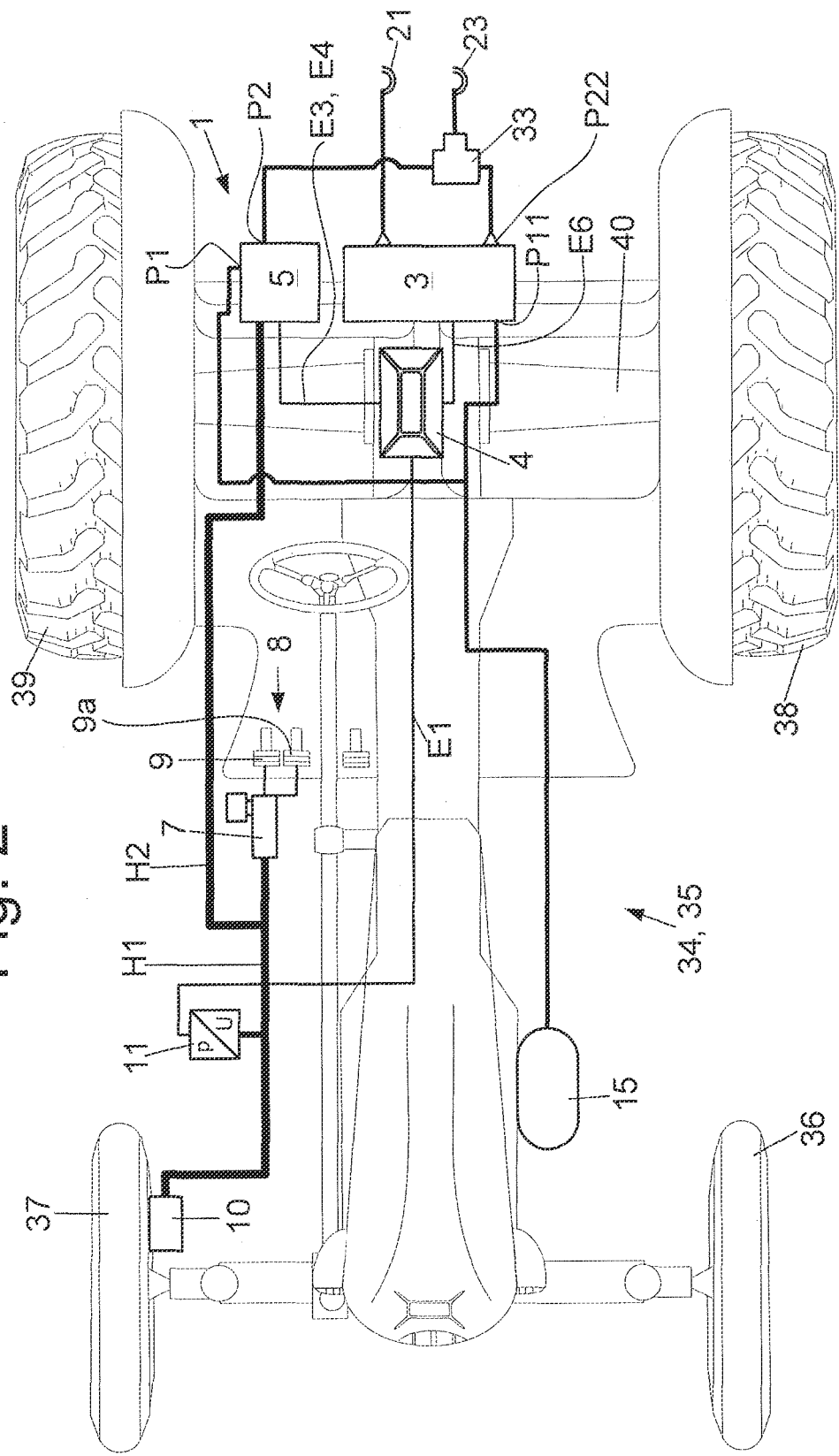
FIG. 2 diagrammatically shows a towing vehicle, with components of the brake module from FIG. 1 attached thereto.

FIG. 2 shows a towing vehicle 34 in the form of an agricultural tractor 35 having two steered front wheels 36, 37 and two non-steered rear wheels 38, 39. Front wheels 36, 37 and rear wheels 38, 39 are assigned, in each case, one wheel brake (not shown), which can he actuated, in each ease, by way of a wheel brake cylinder 10 (only one wheel brake cylinder 10 is shown in FIG. 2 for the sake of simplicity). Wheel brake cylinder 10 is assigned to the right-hand front wheel 37. FIG. 2 illustrates, above all, where the essential components of brake module 1 are arranged or can be arranged on towing vehicle 34. FIG. 2 also illustrates that, as is customary in agricultural tractors, brake actuating member 8 has two brake pedals 9, 9a, by way of which the brakes of the right-hand and left-hand vehicle side, respectively, can be actuated to produce steering braking operations when driving away from sealed roads. Brake pedals 9, 9a are connected mechanically to brake master cylinder 7, by way of which hydraulic pressure is fed via hydraulic pressure line H1 to wheel brake cylinders 10. Hydraulic branching line H2 branches off from hydraulic pressure line H1. Hydraulic control pressure is fed through hydraulic branching line H2 to redundancy valve arrangement 5 (shown only diagrammatically in FIG. 2). Redundancy valve arrangement 5 is arranged in the region of a rear axle 40 of towing vehicle 34, just like electropneumatic pressure regulating module 3. The control electronics, which are arranged on rear axle 40 according to FIG. 2, can also be arranged at a different location of the vehicle; for example, they can be flange-connected to electropneumatic pressure regulating module 3 or they can also be situated at a completely different location of the towing vehicle. It is likewise possible to flange-connect redundancy valve arrangement 5 to the electropneumatic pressure regulating module.

Modules 3, 4, 5, 33 of brake module 1 can be combined in any desired manner with one another; and they can be arranged at any desired or particularly suitable location of towing vehicle 34. For example, the individual modules 3, 4, 5, 33 can be flange-connected to one another or can be attached in a distributed manner to towing vehicle 34.

Figure 3:
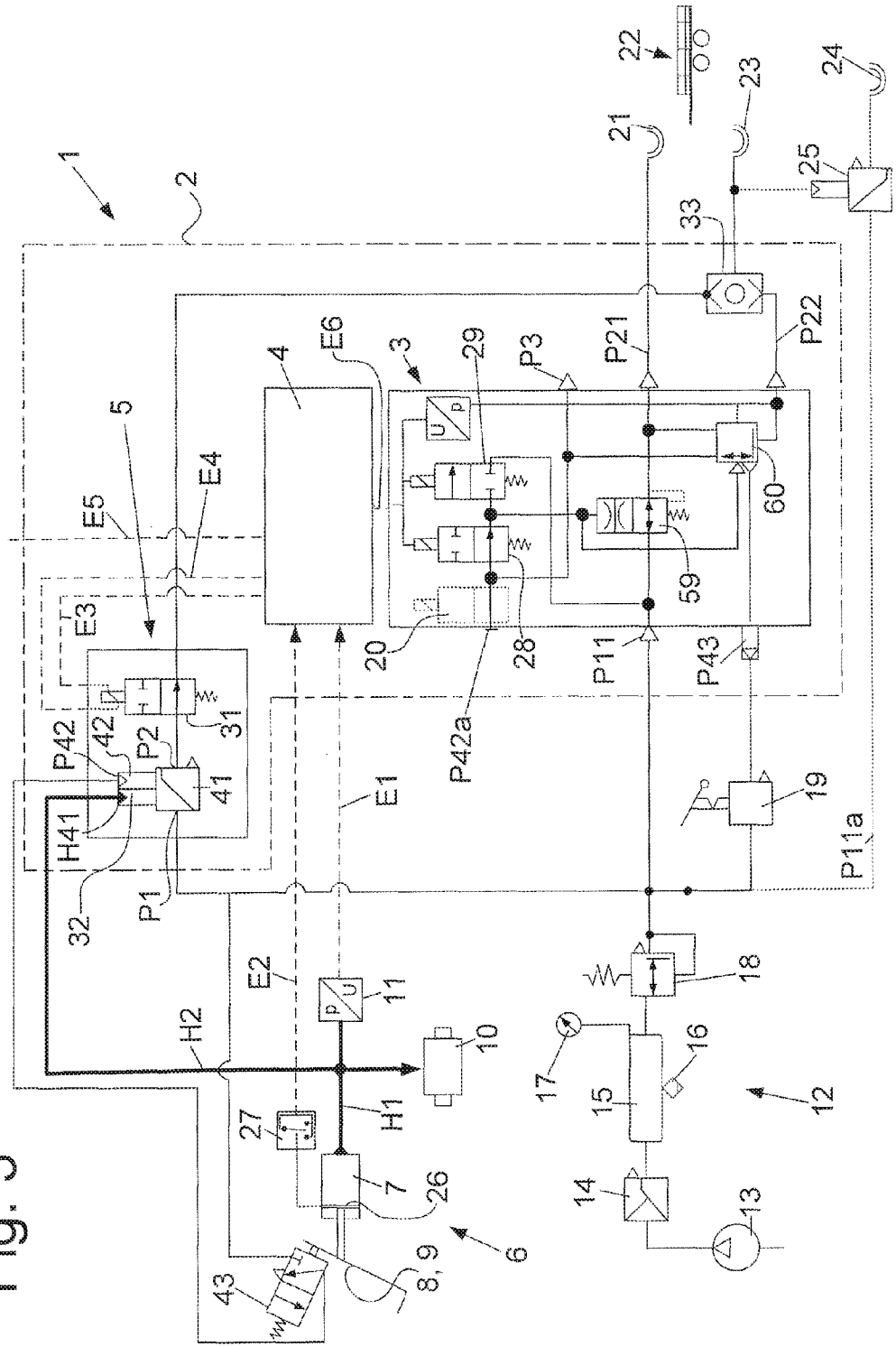
FIG. 3 is a circuit diagram of a brake module according to a second exemplary embodiment of the present invention.

FIG. 3 shows a second exemplary embodiment of brake module 1, which corresponds largely to that shown in FIG. 1 and uses identical designations for identical parts; the functionality of the embodiment of brake module i according to FIG. 3 also corresponds fundamentally to that described above with reference to FIG. 1. Accordingly, the following description focuses on differences with respect to brake module 1 according to FIG. 1. The essential difference of the arrangement according to FIG. 3 consists in a different embodiment of a pressure reducer relay valve 41 of redundancy valve arrangement. Like pressure reducer relay valve 30 of FIG. 1, pressure reducer relay valve 41 according to FIG. 3 has a hydraulic control inlet 32, at which hydraulic pressure prevails via a control inlet H41. In addition to a hydraulic control inlet, pressure reducer relay valve 41 also has a pneumatic control inlet, into which pneumatic pressure is fed. In order to feed pneumatic control pressure in accordance with the actuation of brake pedal 9 into the pneumatic control inlet of pressure reducer relay valve 41, brake pedal 9 is connected to a 3/2-way valve 43. The normally closed 3/2-way valve is connected to compressed air reservoir 15. Upon actuation of brake pedal 9, 3/2-way valve 43 is opened and compressed air flows into the pneumatic control inlet.

In the normal case (i.e., when the electric and the electronics are functioning), pressure reducer relay valve 41 according to FIG. 3 is also without effect, since redundancy solenoid valve 31, which is connected downstream, is closed, with the result that no pneumatic pressure passes to control pressure coupling head 23. The control pressure is therefore also generated by electropneumatic pressure regulating module 3 in this arrangement. However, in the redundancy case when the electric or electronics have failed at least partially, redundancy solenoid valve 31 is also open in the arrangement according to FIG. 3, since it is no longer energized by electrical lines E3, E4. In this case, the pneumatic control pressure is added via pneumatic outlet P2 to shuttle valve 33, via which the pneumatic control pressure passes to control pressure coupling head 23. Since pneumatic control pressure acts on the pneumatic control inlet in addition to the hydraulic pressure in the arrangement according to FIG. 3, more rapid or antecedent braking of trailer vehicle 22 can be achieved, and the antecedent braking of trailer vehicle 22 can be regulated and set in an improved manner.

FIG. 4 shows a third exemplary embodiment of brake module 1, which corresponds largely to that shown in FIG. 1 and uses identical designations for identical parts. The function and method of operation of brake module 1 according FIG. 4 is also otherwise the same as that of brake module 1 according to FIG. 1. The only difference consists in that an additional pressure sensor 44 is provided in redundancy valve arrangement 5. Pressure sensor 44 is connected via an electrical line E7 to ECU 4, and detects the hydraulic pressure prevailing at hydraulic control inlet 32. In the embodiment according to FIG. 4, the hydraulic brake pressure is therefore detected by way of two pressure sensors 11 and 44. A double pressure detection of this type can be utilized, for example, to detect leaks or pressure losses in the hydraulic system. If a corresponding pressure difference is detected by the system, a corresponding fault message can be indicated to the vehicle driver on the dashboard, for example in the form of a visual or acoustic signal.

FIG. 5 shows redundancy valve arrangement 5 according to FIG. 3 in partial longitudinal section. Pressure reducer relay valve 41 has a housing 45, in which a stepped relay piston 46 is mounted such that it can be displaced longitudinally. After actuation of brake pedal 9, hydraulic brake fluid is fed in via hydraulic control inlet 32. The hydraulic brake fluid then loads an end-side piston face 47 of relay piston 46. As a result, the relay piston is displaced and presses a tappet face 48 against a valve sleeve 49, which is pressed by a compression spring 50 against a valve seat 51. Upon brake actuation, the hydraulic pressure prevailing at end-side piston face 47 is greater than the pressure exerted on valve sleeve 49 by way of compression spring 50, with the result that valve sleeve 49 is displaced and is pressed away from its valve seat 51. Lifting off of valve sleeve 49 from valve seat 51 causes pneumatic connector P1 to be connected to pneumatic outlet P2 and con pressed air can flow via pneumatic connector P1 to pneumatic outlet P2.

In a released position, that is, when brake pedal 9 is released, hydraulic brake fluid passes via a return line (not shown in FIG. 5) back to the storage reservoir of master cylinder 7. The diminishing or ending of the hydraulic pressure causes compression spring 50 to displace valve sleeve 49 again and to press it onto its valve seat 51, as a result of which pneumatic inlet P1 is disconnected from pneumatic outlet P2. A second compression spring 52 presses relay piston 46 into its end position or rest position (shown in FIG. 5). Any pneumatic pressure that is possibly still present in housing 45 is output to the surroundings via a ventilating outlet 53.

In addition to hydraulic connector 32, pressure reducer relay valve 41 has a pneumatic, control pressure connector 42 for pneumatic control inlet P42 (described above in connection with FIG. 3). Upon brake actuation, compressed air that flows into pneumatic control pressure connector 42 loads a middle or second piston face 54. Here middle or second piston face 54 has a greater diameter than end-side piston face 47. If pneumatic control pressure passes into the pneumatic control inlet and therefore to second piston face 54, relay piston 46 is displaced in the above-described way, the greater piston diameter of second piston face 54 causing the relay piston to be moved more rapidly, as a result of which trailer vehicle 22 is then ultimately braked more rapidly, that is, antecedently with respect to the towing vehicle.

Redundancy solenoid valve 31 is flange-connected directly to pneumatic pressure outlet P2. Redundancy solenoid valve 31 has a closure member 56 that can be moved by way of a magnet coil and is pressed in the direction of a valve seat 58 counter to the pressure of a compression spring when magnet coil 55 is excited. In the energized position (illustrated in FIG. 5), closure member 56 is therefore pressed against valve seat 58, as a result of which an outlet duct 59 is closed. As a result, no compressed air can pass out of redundancy valve arrangement 5 to shuttle valve 33 and therefore to control pressure coupling head 23—even in the ease of an open position of valve sleeve 49.

Redundancy valve arrangement 5 according to FIGS. 1 and 4 is configured fundamentally the same as that of FIG. 5, with the single difference that pressure reducer relay valve 30 of redundancy valve arrangement 5 according to FIGS. 1 and 4 does not have a pneumatic control pressure connector 42 and, correspondingly, does not have a pneumatic control pressure inlet P42, since pressure reducer relay valve 30 is controlled purely hydraulically.

In addition to the above-described use of brake module 1 for purely hydraulically braked towing vehicles, it is likewise possible to use the brake module for towing vehicles that have what is known as an "air over hydraulic" (AoH) system. In conventional systems of this type (e.g., as described in Applicant's DE 10 2011 122 637 A1), the entire brake system is principally of pneumatic configuration, and merely the wheel brake cylinders of the individual wheels are braked hydraulically. In such systems, what are known as AoH converters are used to convert pneumatic pressure into hydraulic pressure for the wheel brake cylinders. Purely pneumatic actuation of a correspondingly configured conventional redundancy valve is possible. In some circumstances and for particular applications, however, it can be advantageous if the hydraulic pressure of the wheel brake cylinders is used to operate a redundancy valve arrangement according to the above-described type.

It will thus be seen that the objects set forth above, among those made apparent from the preceding description, are efficiently attained, and since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall therebetween.

What is claimed is:

1. A brake module for a hydraulically braked towing vehicle, the towing vehicle being coupleable to a pneumatically braked trailer vehicle, the towing vehicle including a hydraulically actuated service brake having at least one brake master cylinder actuatable by a brake actuator to generate a hydraulic pressure in at least one wheel brake cylinder of at least one wheel of the towing vehicle, the at least one brake master cylinder having a hydraulic pressure line emanating therefrom and connected to at least one pressure sensor configured to detect the hydraulic pressure, the brake module comprising:

an electropneumatic pressure regulating module having an electronic controller configured to receive pressure signals from the at least one pressure sensor and convert them into control pulses for electromagnetic control valves arranged in the electropneumatic pressure regulating module, the control valves being configured to connect (i) on an inlet side via a pneumatic supply pressure inlet to a compressed air reservoir and (ii) on an outlet side via a pneumatic control pressure outlet to a control pressure coupling head;

a hydraulic connection to the hydraulic pressure line;

a pneumatic connection to the compressed air reservoir; and a redundancy valve arrangement having a pneumatic outlet, the pneumatic outlet being configured to connect to the control pressure coupling head when an electrical or electronic component failure of at least one component relevant to operation of the brake module exists, the pneumatic outlet being configured to disconnect from the control pressure coupling head when no electrical or electronic component failure of the at least one component relevant to operation of the brake module exists;

wherein the electropneumatic pressure regulating module and the redundancy valve arrangement are connected pneumatically in parallel o one another, the pneumatic outlet of the redundancy valve arrangement being exclusively connectable to the control pressure coupling head.

2. The brake module as claimed in claim 1, wherein the redundancy valve arrangement includes a mechanical pressure reducer relay valve, and a redundancy solenoid valve that is open in a non-energized state, the redundancy solenoid valve being configured to shut off the pneumatic outlet of the redundancy valve arrangement in an energized state and open the pneumatic outlet of the redundancy valve arrangement in the non-energized state.

3. The brake module as claimed in claim 2, wherein the pressure reducer relay valve includes a hydraulic control inlet and a pneumatic control inlet.

4. The brake module as claimed in claim 3, wherein the pneumatic control pressure connector is configured to (i) receive compressed air from a 3/2-way valve that is connected to the compressed air reservoir and is open on actuation of the brake actuator, and (ii) pass the compressed air into the pneumatic control inlet of the pressure reducer relay valve.

5. The brake module as claimed in claim 2, wherein the redundancy solenoid valve is flange-connected directly to a pneumatic pressure outlet of the pressure reducer relay valve.

6. The brake module as claimed in claim 1, further comprising a shuttle valve configured to connect (i) to the pneumatic outlet of the redundancy valve arrangement and to the pneumatic control pressure outlet of the electropneumatic pressure regulating module, and (ii) to the control pressure coupling head.

7. The brake module as claimed in claim 1, wherein the pressure regulating module, the electronic controller, and the redundancy valve arrangement are arranged in a common housing.

8. The brake module as claimed in claim 1, wherein the pressure regulating module, the electronic controller, and the redundancy valve arrangement are flange-connected to one another.

* * * * *